(12) United States Patent
Pott

(10) Patent No.: US 7,458,203 B2
(45) Date of Patent: Dec. 2, 2008

(54) HYBRID VEHICLE AND METHOD FOR OPERATING A HYBRID VEHICLE

(75) Inventor: Ekkehard Pott, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/358,320

(22) Filed: Feb. 21, 2006

(65) Prior Publication Data
US 2006/0213186 A1   Sep. 28, 2006

Related U.S. Application Data

(63) Continuation of application No. PCT/EP2004/007856, filed on Jul. 15, 2004.

(30) Foreign Application Priority Data
Aug. 20, 2003 (DE) ................ 103 38 871

(51) Int. Cl.
*F01N 3/00* (2006.01)
(52) U.S. Cl. .............. 60/285; 60/274; 60/284; 60/286; 180/65.1; 180/65.2; 180/65.3; 180/165
(58) Field of Classification Search ........... 60/274, 60/277, 284, 285, 286; 180/165, 65.1, 65.2, 180/65.3, 65.4
See application file for complete search history.

(56) References Cited

U.S. PATENT DOCUMENTS

| | | | |
|---|---|---|---|
| 6,059,057 A * | 5/2000 | Yamazaki et al. | 180/65.2 |
| 6,079,204 A * | 6/2000 | Sun et al. | 60/274 |
| 6,301,529 B1 | 10/2001 | Itoyama et al. | |
| 6,321,530 B1 * | 11/2001 | Hoshi et al. | 60/274 |
| 6,327,852 B1 | 12/2001 | Hirose | |
| 6,389,352 B1 * | 5/2002 | Sun et al. | 701/102 |
| 6,427,793 B1 | 8/2002 | Hanada et al. | |
| 6,453,665 B1 | 9/2002 | Bower, Jr. et al. | |

(Continued)

FOREIGN PATENT DOCUMENTS

DE   199 35 826 A1   3/2000

(Continued)

OTHER PUBLICATIONS

Search Report issued by the German Patent Office for German Patent Application No. DE 103 38 871.0, dated Mar. 24, 2004.

*Primary Examiner*—Binh Q Tran
(74) *Attorney, Agent, or Firm*—Manfred Beck, P.A.

(57) ABSTRACT

A method for operating a hybrid vehicle is provided. The hybrid vehicle has a combustion engine and an electric motor each providing a torque for operating the hybrid vehicle. The hybrid vehicle has an exhaust gas system with a catalytic converter system for at least one exhaust gas component. An energy storage device stores and returns electric energy. At least one value of a catalytic converter activity is ascertained. The at least one value of the catalytic converter activity is compared with at least one given limit value. A torque addition of the electric motor is provided in dependence on the comparison result and on a status value of the energy storage device in order to influence activity parameters of the catalytic converter system wherein the torque addition is a motor torque addition or a generative torque addition. A hybrid vehicle is also provided.

3 Claims, 3 Drawing Sheets

U.S. PATENT DOCUMENTS

| | | | |
|---|---|---|---|
| 6,672,050 B2 * | 1/2004 | Murata et al. .................. | 60/284 |
| 7,007,464 B1 | 3/2006 | Asami et al. | |
| 7,059,116 B2 * | 6/2006 | Kusada et al. .................. | 60/285 |
| 2003/0046927 A1 | 3/2003 | Nagai et al. | |

FOREIGN PATENT DOCUMENTS

| | | |
|---|---|---|
| DE | 10041535 A1 | 3/2001 |
| DE | 103 38 181 A1 | 7/2005 |
| EP | 1 182 074 A2 | 2/2002 |
| EP | 1 291 510 A2 | 3/2003 |
| GB | 2 326 857 A1 | 1/1999 |
| JP | 11223140 A | 8/1999 |
| JP | 2000 035149 A | 2/2000 |
| JP | 2000 110604 A | 4/2000 |
| JP | 2001 115869 A | 4/2001 |
| JP | 2003 176737 A | 6/2003 |
| WO | WO 92/15778 A1 | 9/1992 |
| WO | WO 00/23295 A1 | 4/2000 |

* cited by examiner

HYBRID VEHICLE AND METHOD FOR OPERATING A HYBRID VEHICLE

CROSS-REFERENCE TO RELATED APPLICATION

This application is a continuation, under 35 U.S.C. § 120, of copending International Application No. PCT/EP2004/007856, filed Jul. 15, 2004, which designated the United States; this application also claims the priority, under 35 U.S.C. § 119, of German Patent Application No. DE 103 38 871.0, filed Aug. 20, 2003; the prior applications are herewith incorporated by reference in their entirety.

BACKGROUND OF THE INVENTION

Field of the Invention

The invention relates to a hybrid vehicle and to a method of operating a hybrid vehicle.

Vehicles with a parallel hybrid drive have a combustion engine as well as at least one electric motor which drives via the same driveline or via a another drive line of the combustion engine at least one vehicle wheel. Insofar as the electric motor can also be operated as a generator, this allows a motor support or a generative additional load by the electric motor and a certain decoupling from the combustion engine operation at almost any point of the vehicle operating characteristic input-output map.

As a result, the exhaust gas quality changes, in particular with respect to the exhaust gas mass flow, the exhaust gas temperature and the emission composition. Such a change of the emission quality has consequences for the function and efficiency of a catalytic converter system which is provided downstream of the combustion engine. Published European Patent Application No. EP 1 182 074 A2 discloses increasing the load of the combustion engine by a generator operation of the electric motor in-case of a catalytic converter temperature below a characteristic light-off temperature and thus achieving an increase in the exhaust gas temperature and a faster lighting-off of the catalytic converter system after a cold start. It is further suggested to reduce the load of the combustion engine by a motor operation of the electric motor when the engine and, respectively, the catalytic converter system are at their respective operating temperature.

For the hydrocarbon (HC) conversion, in particular in a pre-catalytic converter, it is the case that there is a higher cooling in the lean operation and in the stratified operation than in a purely stoichiometric operation. In long phases of low load and lean operation it may be the case that the temperature of the pre-catalytic converter falls below the above-mentioned light-off temperature such that a suppression of the lean operation is necessary. This is in particular the case with catalytic converters that have aged.

In addition, $NO_x$ storage catalytic converters have operating limits, which must be observed for a highly efficient storage of $NO_x$ during lean operation in order to comply with emissions regulations. The operating limits include in particular a minimum temperature, a maximum temperature and a maximum permissible $NO_x$ mass flow upstream of the storage catalytic converter, and a maximum permissible exhaust gas mass flow. When one of these limits is exceeded, the lean operation must be suppressed in favor of the stoichiometric operation. With increasing age of the catalytic converter, these limits are getting tighter.

International Publication No. WO 00/23 295 A1 discloses a combustion engine which has a direct injection, is capable of a stratified charge operation and is directly coupled to an electric motor. In order to allow a lean operation and in order to keep the exhaust gas temperatures in a range in which it is possible to comply with emissions regulations, the electric motor is put into a generator operation at given times. A catalytic converter system, which includes in particular a nitrogen oxide ($NO_x$) trap, is assigned to the combustion engine. The $NO_x$ trap has a temperature window for a correct operation between 250° C. and 450° C.

Published, Non-Prosecuted German Patent Application No. DE 199 35 826 A1 discloses a torque control for direct injection engines with the help of an additional torque device. During a transition from one operating mode of the engine with a lean air-fuel ratio to a rich air-fuel ratio the additional torque device ensures that the desired torque output of the engine is maintained.

Further, U.S. Pat. No. 6,301,529 B1 discloses a hybrid vehicle wherein the speed of the combustion engine and the output power of the electric motor are controlled such that the vehicle can be operated at a given point of an $NO_x$ contour. International Publication No. WO 92/15 778 A1 discloses a combustion engine having a device in order to support the total torque by an additional drive at least in a portion of the speed-load range. In this way, the combustion engine is to be kept in a range of lean operation. The additional torque is in this case used as a substitute or alternative for a rich operation of the combustion engine.

United Kingdom Patent Application No. GB 2 326 857 A further discloses a hybrid vehicle wherein a catalytic converter system is kept within an optimum temperature range.

Japanese Patent Applications JP 11223 140 A, JP 2000035 149 A, JP 200011 0604 A, and JP 2001115 869 A further disclose hybrid vehicles wherein measures are provided for influencing a temperature of a catalytic converter in dependence of the generator power.

An optimum acquisition and control of the interaction between the catalytic converter system and the hybrid system formed of the combustion engine and the electric motor, is however not yet possible with the prior art method.

SUMMARY OF THE INVENTION

It is accordingly an object of the invention to provide a hybrid vehicle and a method of operating a hybrid vehicle which overcome the above-mentioned disadvantages of the heretofore-known hybrid vehicles and methods of operating hybrid vehicles of this general type and which have an optimized interaction between the hybrid system, formed of the combustion engine and the electric motor, and the catalytic converter system assigned to the combustion engine in order to achieve a low fuel consumption and a low pollutant emission.

With the foregoing and other objects in view there is provided, in accordance with the invention, a method for operating a hybrid vehicle, which includes the steps of:

providing a hybrid vehicle having a combustion engine and an electric motor respectively for providing a torque for operating the hybrid vehicle;

providing an exhaust gas system for the combustion engine, the exhaust gas system having a catalytic converter system for at least one exhaust gas component;

providing an energy storage device for storing and returning electric energy;

ascertaining at least one value of a catalytic converter activity;

comparing the at least one value of the catalytic converter activity with at least one given limit value and providing a comparison result; and providing a torque addition (M_E) of the electric motor in dependence on the comparison result and on a status value of the energy storage device in order influence activity parameters of the catalytic converter system wherein the torque addition is a motor torque addition or a generative torque addition.

In other words, according to the invention, there is provided a method for operating a hybrid vehicle with a combustion engine and at least one electric motor, respectively for outputting a torque for operating the vehicle, in particular in order to drive at least one vehicle wheel, wherein an exhaust gas system with a catalytic converter system for at least one exhaust gas component is assigned to the combustion engine and an energy storage device for storing and returning electric energy is provided, wherein at least one value of a catalytic converter activity is ascertained and is compared to at least one limit value and wherein, in dependence of the comparison result and of a status value of the energy storage, a motor torque addition or a generative torque addition (M_E) of at least one electric motor is provided for influencing activity parameters of the catalytic converter system. Thus it is possible to adapt the operating point of the combustion engine optimally to the value of the current catalytic converter efficiency and thus to solve the conflicting goals of emission safety and low fuel-consumption.

Another mode of the method according to the invention includes driving at least one vehicle wheel with the torque provided by the combustion engine and the electric motor.

Yet another mode of the method according to the invention includes influencing, with the torque addition (M_E) of the electric motor, in a targeted manner at least one activity parameter of the catalytic converter system, wherein the at least one activity parameter is selected from the group of an exhaust gas mass flow and a raw emission of at least one exhaust gas component.

A further mode of the method according to the invention includes influencing the raw emission of at least one exhaust gas component selected from the group of a nitrogen oxide, a hydrocarbon and carbon monoxide.

Another mode of the method according to the invention includes providing the combustion engine as an engine capable of a lean operation in at least a homogeneous phase and/or a stratified phase.

Another mode of the method according to the invention includes providing the catalytic converter system as a system having at least a three-way catalytic converter or an $NO_x$ storage catalytic converter.

A further mode of the method according to the invention includes characterizing the catalytic converter activity by an $NO_x$ storage capability or an oxygen storage capability.

Yet a further mode of the method according to the invention includes adjusting a value of a catalytic converter temperature (T_Kat) by using the torque addition of the electric motor such that the value of the catalytic converter temperature is within a given temperature window (TF).

Another mode of the method according to the invention includes observing an upper limit of at least one activity parameter of the catalytic converter system by using the torque addition of the electric motor, the activity parameter being an exhaust gas mass flow and/or at least a nitrogen oxide raw emission, a hydrocarbon raw emission or a carbon monoxide raw emission.

A further mode of the method according to the invention includes providing a motor support with the electric motor if a catalytic converter temperature (T_Kat) is within a given temperature window (TF1) and an exhaust gas mass flow and/or a raw emission of at least one exhaust gas component is not greater than a threshold value (SW1).

Another mode of the method according to the invention includes providing no motor support with the electric motor if the energy storage device has less energy stored than an energy defined by a given threshold value (E_SPmn).

Another mode of the method according to the invention includes providing no motor support with the electric motor if a catalytic converter temperature (T_Kat) is within a given temperature window (TF2) and an exhaust gas mass flow and/or a raw emission of at least one exhaust gas component is greater than a threshold value (SW2).

A further mode of the method according to the invention includes providing a motor support with the electric motor if the energy storage device has more energy stored than an energy defined by a given threshold value (E_SPmx).

A further mode of the method according to the invention includes providing a generative support with the electric motor if a catalytic converter temperature (T_Kat) is below a limit temperature (T_mn).

Another mode of the method according to the invention includes providing a generative support with the electric motor if a catalytic converter temperature (T_Kat) is below a limit temperature (T_mn) and if it can be achieved within a given time interval (t_l) that a value of the catalytic converter temperature (T_Kat) is within a given temperature window (TF3).

Yet another mode of the method according to the invention includes providing a generative support with the electric motor if a catalytic converter temperature (T_Kat) is below a limit temperature (T_mn) and if it can be achieved within a given time interval (t_l) that an exhaust gas mass flow is less than a given threshold value (SW3).

Another mode of the method according to the invention includes providing a generative support with the electric motor if a catalytic converter temperature (T_Kat) is below a limit temperature (T_mn) and if it can be achieved within a given time interval (t_) that a raw emission of at least one exhaust gas component is less than a given threshold value (SW3).

A further mode of the method according to the invention includes providing no generative support with the electric motor if a catalytic converter temperature (T_Kat) is below a limit temperature (T_mn1).

Another mode of the method according to the invention includes providing no generative support with the electric motor if a catalytic converter temperature (T_Kat) is below a limit temperature (T_mn1) and if it cannot be achieved within a given time interval (t_11) that a value of a catalytic converter temperature (T_Kat) is within a given temperature window (TF4) and that an exhaust gas mass flow is less than a given threshold value (SW4).

A further mode of the method according to the invention includes providing no generative support with the electric motor if a catalytic converter temperature (T_Kat) is below a limit temperature (T_mn1) and if it cannot be achieved within a given time interval (t_11) that a value of a catalytic converter temperature (T_Kat) is within a given temperature window (TF4) and that a raw emission of at least one exhaust gas component is less than a given threshold value (SW3).

A further mode of the method according to the invention includes using a model having values of a load-rotational speed operating point shift of the combustion engine correlated with values of an exhaust gas mass flow and/or values of a raw emission of at least one exhaust gas component; and taking into account the values of the load-rotational speed operating point shift of the combustion engine when setting a torque output of the electric motor in order to reduce a total energy expenditure when operating the hybrid vehicle.

Another mode of the method according to the invention includes using a model correlating an operation of the catalytic converter system and/or an operation of the energy storage device with an energy expenditure; and taking into account the operation of the catalytic converter system and/or the operation of the energy storage device when setting a torque output of the electric motor in order to reduce a total energy expenditure when operating the hybrid vehicle.

Another mode of the method according to the invention includes using a model correlating a regeneration frequency of a catalytic converter and/or an operation of the energy storage device with an energy expenditure; and taking into account the regeneration frequency of the catalytic converter and/or the operation of the energy storage device when setting a torque output of the electric motor for reducing a total energy expenditure when operating the hybrid vehicle.

A further mode of the method according to the invention includes using an $NO_x$ storage catalytic converter as the catalytic converter.

Another mode of the method according to the invention includes shifting an operating point of the combustion engine in a direction towards a reduced load in order to reduce a regeneration frequency of a catalytic converter, preferably an $NO_x$ storage catalytic converter, wherein a catalytic converter temperature (T_Kat) is preferably within a given temperature window (T_F5).

A further mode of the method according to the invention includes generating electric energy during coasting phases of the combustion engine in order to charge the energy storage device.

With the objects of the invention in view there is also provided, a method for operating a hybrid vehicle, which includes the steps of:

providing a hybrid vehicle having a combustion engine and an electric motor respectively for providing a torque for operating the hybrid vehicle;

providing an exhaust gas system for the combustion engine, the exhaust gas system having a catalytic converter system for at least one exhaust gas component;

providing an energy storage device for storing and returning electric energy;

using a model having values of a load-rotational speed operating point shift of the combustion engine correlated with at least one of values of an exhaust gas mass flow and values of a raw emission of at least one exhaust gas component; and taking into account the values of the load-rotational speed operating point shift of the combustion engine when setting a torque output of the electric motor in order to reduce a total energy expenditure when operating the hybrid vehicle.

As defined above, it is preferred if a value of the exhaust gas mass flow is influenced in a targeted manner by the torque addition (M_E), because then it is possible to set or adjust an operation with a favorable consumption of the combustion engine without increasing the pollutant emission downstream of the catalytic converter system.

The advantages of the invention become noticeable in particular in case of a combustion engine which allows a lean operation in at least a homogeneous or a stratified phase, because such a combustion engine has on the one hand a favorable consumption but on the other hand has high demands with respect to maintaining the operating limits of the catalytic converter system.

With the objects of the invention in view there is also provided, a vehicle configuration, including:

a hybrid vehicle having a combustion engine and an electric motor respectively for providing a torque for operating the hybrid vehicle;

an exhaust gas system operatively connected to the combustion engine, the exhaust gas system having a catalytic converter system for at least one exhaust gas component;

an energy storage device operatively connected to the electric motor for storing and returning electric energy; and a control device configured to ascertain at least one value of a catalytic converter activity, compare the value of the catalytic converter activity with at least one given limit value and provide a comparison result, and the control device being configured to control the electric motor to provide a torque addition (M_E) in dependence on the comparison result and on a status value of the energy storage device in order to influence activity parameters of the catalytic converter system, the torque addition being a motor torque addition or a generative torque addition.

According to another feature of the invention, the hybrid vehicle has at least one vehicle wheel; and the torque respectively provided by the combustion engine and the electric motor drives the at least one vehicle wheel.

In other words, according to the invention, there is provided a hybrid vehicle with a combustion engine and at least one electric motor, respectively for outputting a torque for driving at least one vehicle wheel, wherein an exhaust gas system with a catalytic converter system for at least one exhaust gas component is assigned to the combustion engine and an energy storage device for storing and returning electric energy is provided, wherein a device is provided through the use of which at least one value of a catalytic converter activity is ascertained and is compared to at least one limit value and wherein, in dependence of the comparison result and of a status value of the energy storage, a motor torque addition or a generative torque addition (M_E) of at least one electric motor is provided for influencing at least one activity parameter of the catalytic converter system in a targeted manner. Thus it is possible to adapt the operating point of the combustion engine optimally to the value of the current catalytic converter efficiency and thus to solve the conflicting goals of emission safety and low fuel consumption.

An especially high cleaning performance can be achieved with a catalytic converter system which has at least one pre-catalytic converter close to the engine and at least one main catalytic converter provided downstream of the pre-catalytic converter.

Other features which are considered as characteristic for the invention are set forth in the appended claims.

Although the invention is illustrated and described herein as embodied in a hybrid vehicle and a method of operating a hybrid vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
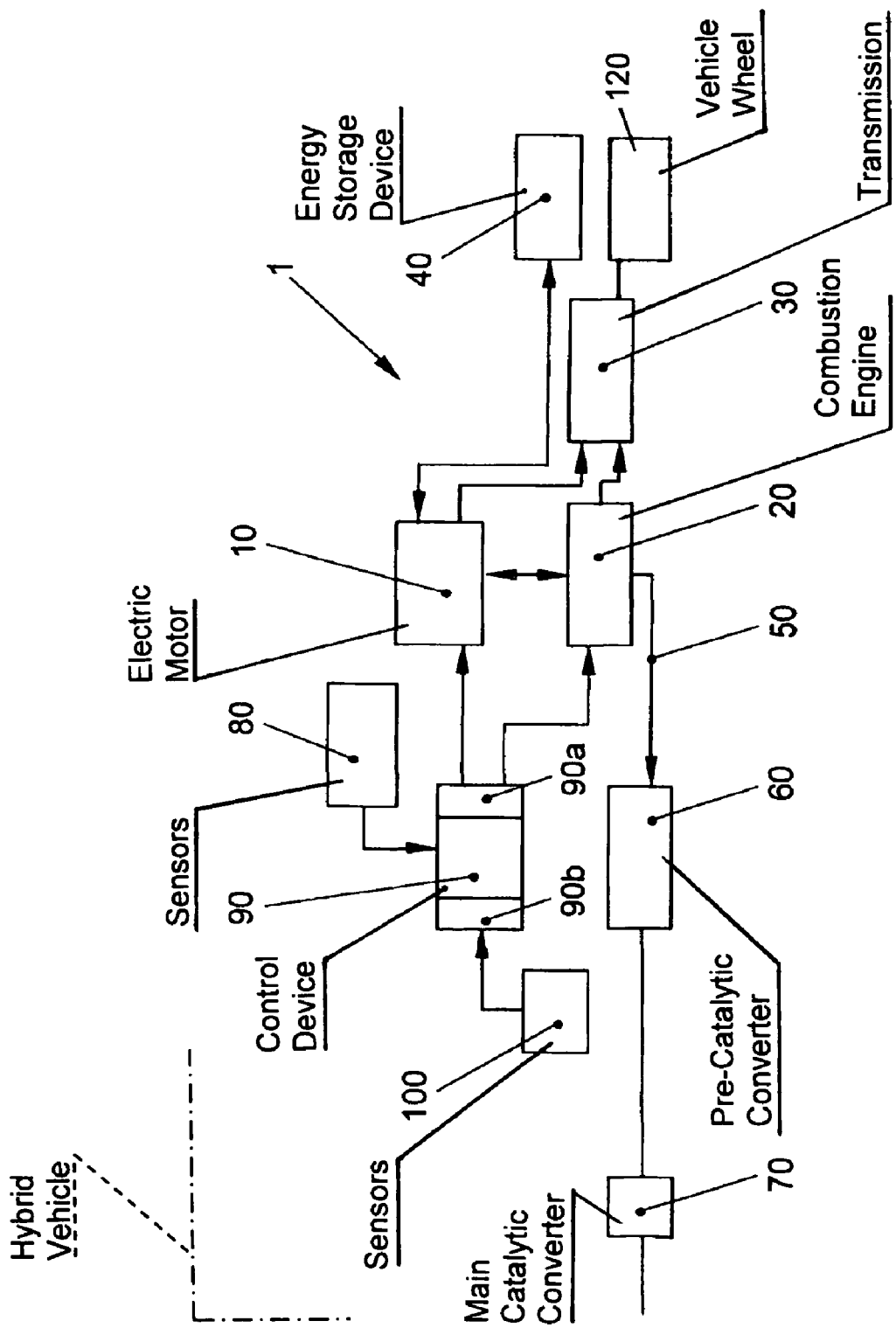
FIG. 1 is a schematic block diagram of a hybrid drive with a control system for a hybrid vehicle according to the invention.

Referring now to the figures of the drawings in detail and first, particularly, to FIG. 1 thereof, there is shown a schematic illustration of a hybrid drive 1 for a hybrid vehicle which is only schematically indicated by a dash-dotted line. An electric motor 10 and a combustion engine 20 are coupled to a transmission 30 which is coupled to at least one vehicle wheel 120. A positioning of the electric motor 10 between a crankshaft output of the combustion engine 20 and a transmission input is preferred. The electric motor 10 is electrically coupled to an electrical energy storage device 40, for example a chargeable battery or the like. The electrical energy storage device 40 may in particular be a combination of a battery, for example a lead or nickel-metalhydrid (Ni-MH) battery, and a capacitor storage. High-performance capacitors have the advantage of a low weight, long operating life and very low maintenance requirements. In particular double-layer capacitors are advantageous as short-time storage for supporting the battery. In accordance with the invention, it is preferred to have a capacitor storage with a maximum energy content of 5% to 30% and ideally from 10% to 20% of the energy content of the battery. The charging of the capacitor storage as well as the battery may also be accomplished by recuperation. The combustion engine 20 has an associated exhaust gas system 50 with a pre-catalytic converter or primary catalytic converter 60 and a main catalytic converter 70 provided downstream. An engine control device 90 receives control signals from control sensors 80, for example the accelerator pedal module or an anti-lock brake system, and receives from sensors 100 values of operating parameters of the hybrid vehicle, in particular of the electric motor 10, of the combustion engine 20, of the exhaust gas system 50 and of further vehicle components.

In a preferred embodiment of the invention, the internal combustion engine 20 is capable of lean operation, preferably a direct injection spark-ignition engine. A direct injection spark-ignition engine which is capable of stratified charge operation is particularly preferred since as a result considerable savings in terms of fuel consumption compared to a conventional spark-ignition engine can be achieved in low load-rotational speed ranges. In particular with these embodiments of the invention it is expedient to configure the catalytic converter system in such a way that the pre-catalytic converter 60 is a three-way catalytic converter and the main catalytic converter 70 is an $NO_x$ storage catalytic converter. The pre-catalytic converter 60 serves preferably for cleaning a stoichiometric exhaust gas, for converting hydrocarbons (HC) in case of a lean exhaust gas and for improving the cleaning of exhaust gas during a cold start. In particular, in order to allow a fast heating of the pre-catalytic converter 60, the pre-catalytic converter is provided at a distance of less than 500 mm, optionally less than 400 mm, particularly preferred at a distance of less than 300 mm of average exhaust gas run length from the cylinder head flange in the exhaust gas system 50. The $NO_x$ storage catalytic converter 70 is preferably configured for storing nitrogen oxides ($NO_x$) in case of a lean exhaust gas. Depending on the loading with $NO_x$ and possibly further constraints it is necessary to regenerate the $NO_x$ storage catalytic converter with an exhaust gas that is stoichiometric to rich.

The conversion activity of the catalytic converter system or its components, the pre-catalytic converter 60 and the $NO_x$ storage catalytic converter 70, is dependent on activity parameters, in particular the catalytic converter temperature. The conversion rate exceeds a limit of for example 50% only above a minimum temperature, the so-called light-off temperature. In general, the light-off temperature of a catalytic converter is different for different pollutant components such as HC or $NO_x$.

Further activity parameters of the catalytic converter system are values of the exhaust gas mass flow, the raw emission of exhaust gas components, in-particular of $NO_x$, HC and carbon monoxide (CO) as well as the loading of the system with $NO_x$ and/or sulfur oxides ($SO_x$). The values of these activity parameters are determined in dependence of the operating parameters of the combustion engine, possibly using a model of the catalytic converter system with the aid of signals of the sensors 100, and are evaluated in the control device 90.

In a preferred embodiment, the control device 90 includes one or more microprocessors, data memories and interfaces as well as a device 90a through the use of which the overall torque is determined in dependence on the control signals of the sensors 80, wherein the overall torque is supplied by the electric motor 10 and by the combustion engine 20 and is made at least partially available to the transmission 30. The coupling between the electric motor 10 and the combustion engine 20 permits both, a negative and a positive torque addition M_E of the electric motor 10.

The sensors 100 include sensors for measuring or determining operating parameters, preferably of the storage device 40, of the electric motor 10, of the combustion engine 20 and of the exhaust gas system 50. In particular, lambda probes may be provided in the exhaust gas system 50 upstream or downstream of the pre-catalytic converter 60 as well as upstream or downstream of the main catalytic converter 70. Further, sensors for $NO_x$, $SO_x$, or HC may be disposed at various locations in the exhaust gas system. In order to measure the temperature of the exhaust gas or of the catalytic converter system it is possible to provide temperature sensors at various installation locations.

The control device 90 includes a device 90b for determining a catalytic converter activity, wherein signals of the sensors 100 are evaluated. The device 90b includes in particular means for comparing the determined catalytic converter activity to activity limit values. In dependence of the comparison result a generative torque output or a motor torque output of the electric motor 10 takes place, in order to keep the operating point of the combustion engine in or shift it into a zone of low fuel consumption and low exhaust gas emission. The above-mentioned torque output is further dependent of a status value of the energy storage device 40, as will be described in more detail below. Because the activity parameters of the catalytic converter system, such as the catalytic converter temperature, the exhaust gas temperature or the $SO_x$ loading, are dependent of the operating point, the activity of the catalytic converter system can be influenced in a targeted manner.

The catalytic converter activity of the catalytic converter system is preferably characterized by an oxygen storage capability and/or an $NO_x$ storage capability, which is per se known and is for example disclosed in German Patent Document No. DE 103 29 599. In this case, the catalytic converter activity of a three-way catalytic converter is preferably determined by its oxygen storage capability and the catalytic converter activity of an $NO_x$ storage catalytic converter is determined by its $NO_x$ storage capability. A direct measurement of the catalytic converter activity via measured emission values of at least one pollutant upstream or downstream of the catalytic converter system or its components is also conceivable.

The catalytic converter activity can be negatively influenced by poisoning and aging processes and as a result of activity parameters being outside of limit values. This restricts the operating ranges of the combustion engine that is available for an operation with a safe emission. According to the invention, it is a goal to reduce or eliminate this restriction.

It is preferable to proceed as follows: If the value of the catalytic converter activity is within permissible limit values at a current operating point then no motor support by the electric motor 10 is required. Therefore, even a generative operation can be permitted. If the catalytic converter activity is outside of the permissible limit values for at least one parameter at a current operating point, then initially the status value of the energy storage device 40 is checked and in dependence of this status a motor support by the electric motor 10 is enabled. The status value preferably characterizes the state of charge of the energy storage device 40. The higher the state of charge of the energy storage device 40, the greater can the deviation be between the current operating point and the operating point that is to be reached, for which a motor support of the combustion engine 20 by the electric motor 10 is enabled. The motor support is in this case selected such that the operating point of the combustion engine 20 that is to be reached, is in a range in which the catalytic converter activity is within the permissible limit values. Preferably, the motor support aims for a reduction of the exhaust gas mass flow of at least one exhaust gas component, the entire exhaust gas mass flow or a value of a catalytic converter temperature or exhaust gas temperature T_Kat. A catalytic converte temperature T_Kat is preferably within a temperature window TF. According to the invention, a catalytic converter temperature T_Kat is set within the temperature window TF by a torque addition M_E.

Further, through the use of the torque addition M_E, an upper limit of an exhaust gas mass flow and/or an upper limit of at least one of an $NO_x$, HC, or CO raw emission is complied with.

Figure 2:
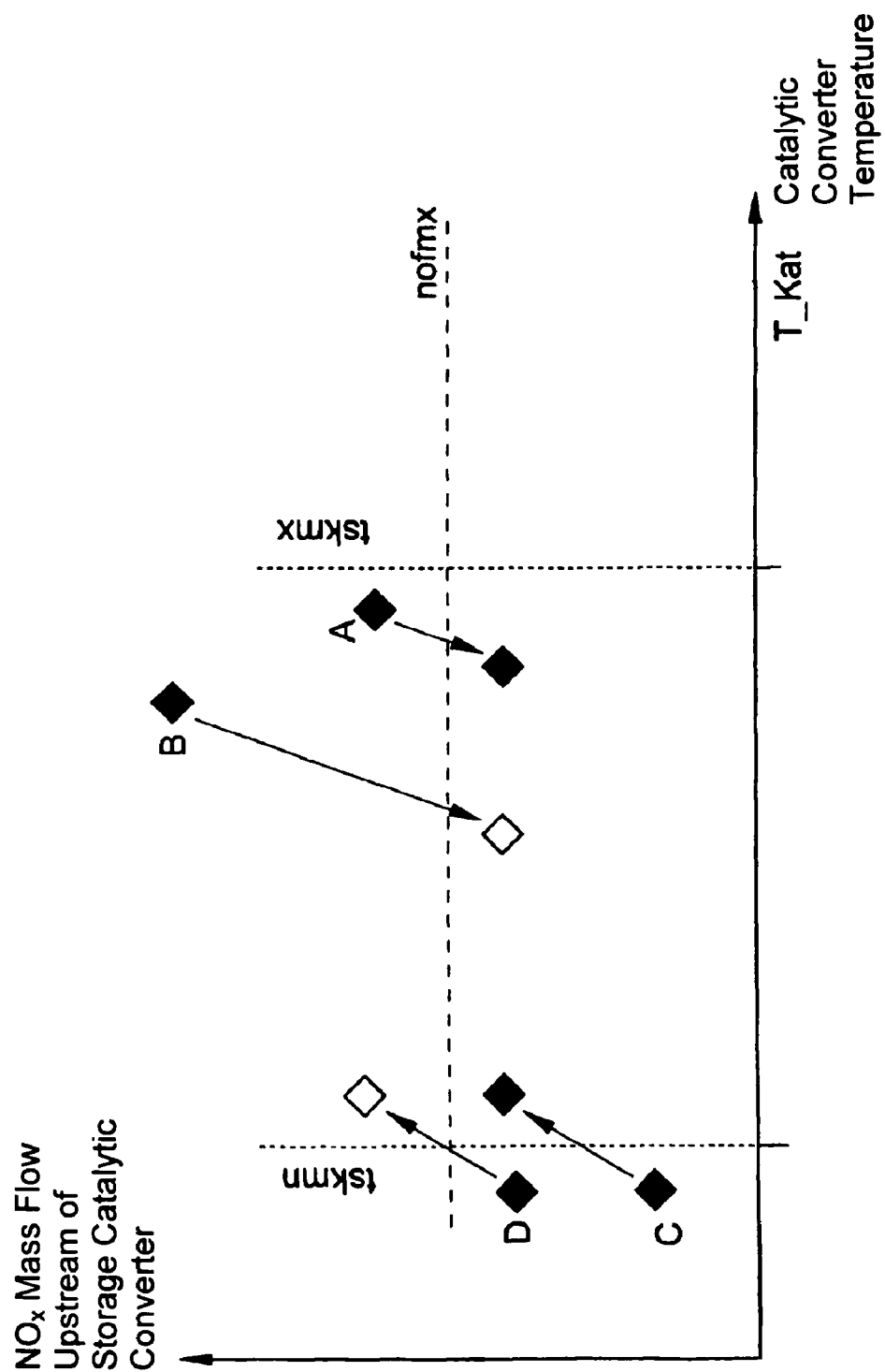
FIG. 2 is a graph illustrating shifts of operating points of a combustion engine for different values of an $NO_x$ mass flow and an $NO_x$ storage catalytic converter temperature in accordance with the invention.

FIG. 2 is a graph that shows shifts of operating points of a combustion engine for different values of an $NO_x$ mass flow and an $NO_x$ storage catalytic converter temperature for illustrating various scenarios for facilitating a lean operation. The $NO_x$ mass flow is in this case understood as a raw emission of the combustion engine 20 upstream of the $NO_x$ storage catalytic converter. A lean operation of the combustion engine is only then permitted if the $NO_x$ mass flow assumes a value that is smaller than a threshold value SW; designated as nofmx in FIG. 2. Further, the $NO_x$ storage catalytic converter must have a temperature within a temperature window TF in order to ensure a sufficient conversion activity. Similar illustrations as those shown in FIG. 2 for the $NO_x$ mass flow are conceivable for the mass flow of HC or CO or the exhaust gas mass flow. A, B, C, and D denote respective operating points of the combustion engine with corresponding values of the activity parameters $NO_x$ mass flow and T_Kat. Starting at an operating point A, a motor support of the combustion engine 20 by the electric motor 10 is useful if the energy storage device 40 has more energy stored than a given threshold value E_SPmx. In the case of A, the permissible limits nofmx of the $NO_x$ mass flow are only slightly exceeded and T_Kat is below the temperature tskmx. In the case of B on the other hand, the value of the $NO_x$ mass flow is much greater than the threshold value nofmx. A motor support makes therefore only sense in case of almost full energy storages, if the energy storage device 40 has stored more energy than a given threshold value E_SPmx.

In the case of C, the $NO_x$ mass flow is smaller than the threshold value nofmx and at the same time the catalytic converter temperature T_Kat is smaller than the limit value tskmn. With a generative support of the combustion engine 20 it is possible to achieve a temperature increase and thus reach an operating point at which all limit values can be observed. In the case of D, the $NO_x$ mass flow is below the threshold value nofmx, but the threshold nofmx value would be exceeded by switching in a load. A generative support is therefore not provided in case D.

The above-described scenario can of course not only be used for an $NO_x$ mass flow but also for an exhaust gas mass flow as well as for raw emissions of further exhaust gas components. According to the invention, a motor support by the electric motor is therefore provided in case of a catalytic converter temperature T_Kat within a predefined temperature window TF1 and an exhaust gas mass flow and/or a raw emission of at least one exhaust gas component, if the respective values of the exhaust gas mass flow or raw emissions are greater than a threshold value SW1. At the same time, no support is provided if the energy storage device has less energy stored than a given threshold value E_SPmn.

A motor support is not provided in case of a catalytic converter temperature T_Kat within a given temperature window TF2 and an exhaust gas mass flow which exceeds a threshold value SW2. The same applies if the raw emission of at least one exhaust gas component exceeds such a threshold value. However, a motor support is provided if the energy storage device has stored more energy than a given threshold value E_SPmx.

When a catalytic converter temperature T_Kat is below a limit temperature T_mn, a generative support is provided if a value of the catalytic converter temperature T_Kat within a temperature window TF3 and/or an exhaust gas mass flow and/or a raw emission of at least one exhaust gas component smaller than a threshold value SW3 can be achieved. In this case it is preferred that the transition can be achieved within a given time interval t_l. The limit temperature T_mn may also be within the usual operating temperature window of the catalytic converter.

In case of a temperature T_Kat below a limit temperature T_mn1, no generative support will be provided if a value of the catalytic converter temperature T_Kat within a temperature window TF4 can be achieved and at the same time at least an exhaust gas mass flow and/or the raw emission of at least one exhaust gas component not smaller than a limit value SW4 can be achieved. A time interval t_l1 can preferably also be set as a time limitation for this case.

Figure 3:
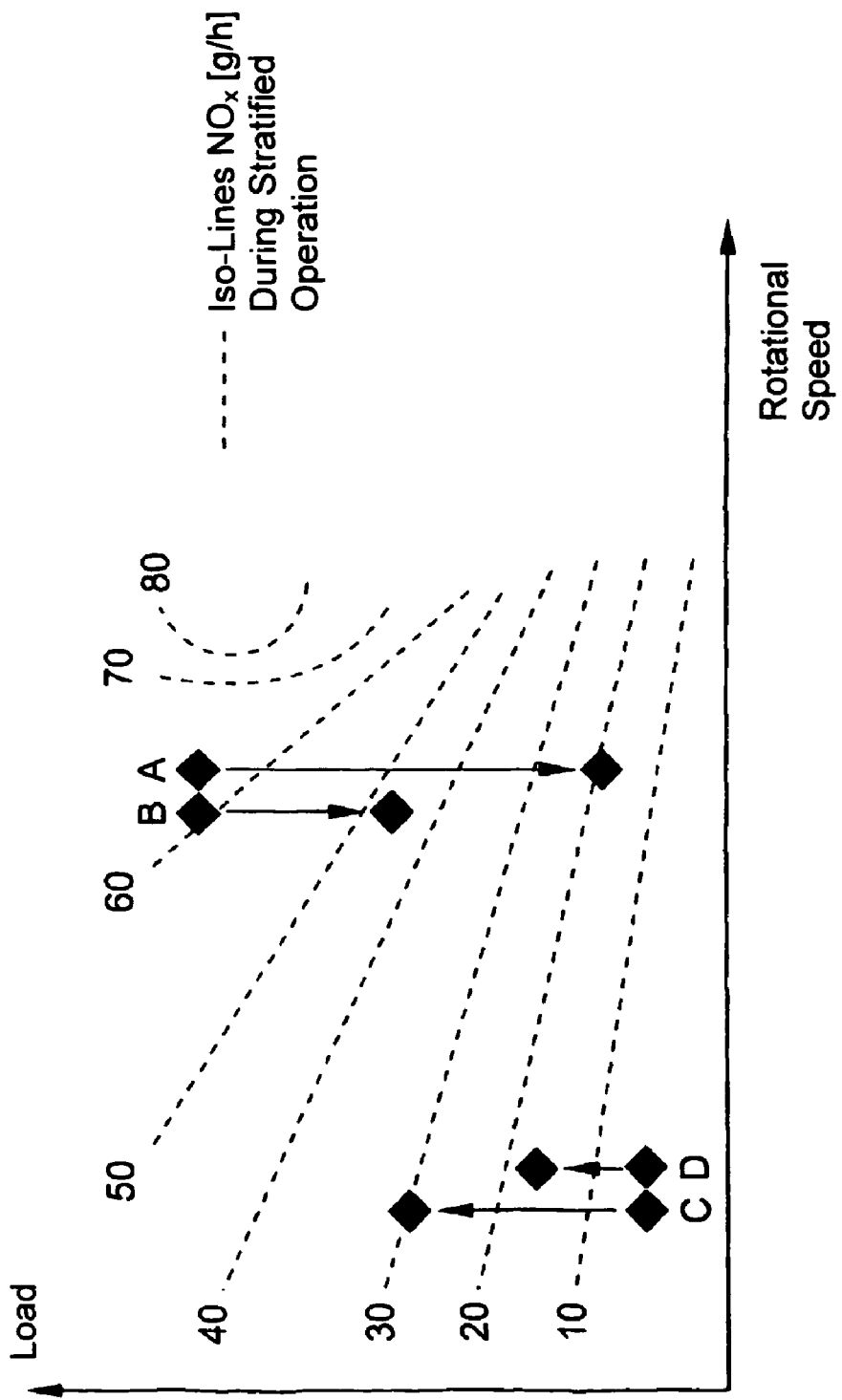
FIG. 3 is a graph illustrating shifts of operating points of a combustion engine with a load-rotational speed characteristic map and illustrating at the same time $NO_x$ contour lines in accordance with the invention.

FIG. 3 is an illustration of shifts of operating points in a load versus rotational speed field. In this field, iso-lines of the hourly $NO_x$ raw emissions in a stratified operation of a lean operated combustion engine are shown, the iso-lines being denoted with the numbers 10, 20, . . . , 80. The raw emission $NO_x$ increases with an increasing load of the combustion engine. A, B, C, and D denote respective shifts of operating points with motor support or generative support in dependence of the status of the energy storage device. A denotes the maximum motor support wherein a transition from an iso-line with a high $NO_x$ value to an iso-line with a low $NO_x$ value takes place by the shift of the operating point. A prerequisite for the transition A is that there is an energy storage device 40 which has more energy stored than a given threshold value. In comparison, the transition denoted by B shows the situation in case of a smaller value for the stored energy. In case of a largely discharged energy storage device 40, no motor support is provided.

An empty energy storage device 40 can be charged by switching in a generative load of the combustion engine 20 as is shown in the cases of C and D. The case C shows the situation in case of a largely discharged energy storage device and the case D shows the situation in case of a partially discharged energy storage device. In case of a largely filled energy storage device no generative load is switched in.

If the $NO_x$ emissions upstream of the storage catalytic converter increase with the load of the combustion engine, it is advantageous, if by a shift of an operating point of the combustion engine in a direction towards lower loads a reduction of the $NO_x$ regeneration frequency is achieved, because this can result in a reduction of consumption.

In a model that is preferably implemented in the engine control device 90, values of a load-rotational speed operating point shift of the combustion engine are correlated with the values of an $NO_x$ raw emission and are taken into account when setting or calculating the torque output of the electric motor for reducing the total energy use when operating the vehicle. This is also conceivable for values of the exhaust gas mass flow and/or the raw emission of further exhaust gas components.

Further, a regeneration frequency of the catalytic converter system 40, preferably of an $NO_x$ storage catalytic converter, and/or of the energy storage device can be correlated in a model with an energy expenditure and can be taken into account when setting the torque output by the electric motor 10 in order to achieve a minimum total energy use when operating the vehicle. Further parameters which are to be taken into account are the temperature limits of the catalytic converter system, i.e. that the catalytic converter temperature T_Kat is within a given temperature window TF5.

A reduction of the total energy expenditure for operating the vehicle results in particular in the case if the electric energy is gained via recuperation during overrunning or coasting phases. This measure is also expediently utilized in dependence on the charging state of the energy storage device 40.

I claim:

1. A method for operating a hybrid vehicle, which comprises:

providing a hybrid vehicle having a combustion engine and an electric motor respectively for providing a torque for operating the hybrid vehicle;

providing an exhaust gas system for the combustion engine, the exhaust gas system having a catalytic converter system for at least one exhaust gas component;

providing an energy storage device for storing and returning electric energy;

using a model having values of a load-rotational speed operating point shift of the combustion engine correlated with at least one of values of an exhaust gas mass flow and values of a raw emission of at least one exhaust gas component; and taking into account the values of the load-rotational speed operating point shift of the combustion engine when setting a torque output of the electric motor in order to reduce a total energy expenditure when operating the hybrid vehicle.

2. A vehicle configuration, comprising:

a hybrid vehicle having a combustion engine and an electric motor respectively for providing a torque for operating said hybrid vehicle;

an exhaust gas system operatively connected to said combustion engine, said exhaust gas system having a catalytic converter system including a catalytic converter for at least one exhaust gas component;

an energy storage device operatively connected to said electric motor for storing and returning electric energy; and a control device configured to ascertain at least one value of a catalytic converter activity, compare the value of the catalytic converter activity with at least one given limit value and provide a comparison result, and said control device being configured to control said electric motor to provide a torque addition in dependence on the comparison result and on a status value of said energy storage device in order to influence activity parameters of said catalytic converter system, the torque addition being selected from the group consisting of a motor torque addition and a generative torque addition, said control device being further configured to use a model correlating at least one of a regeneration frequency of said catalytic converter and an operation of said energy storage device with an energy expenditure and configured to take into account at least one of the regeneration frequency of said catalytic converter and the operation of said energy storage device when setting a torque output of said electric motor for reducing a total energy expenditure when operating said hybrid vehicle.

3. The vehicle configuration according to claim 2, wherein said catalytic converter is an NOx storage catalytic converter.

* * * * *